(12) United States Patent
Watarai et al.

(10) Patent No.: US 7,577,579 B2
(45) Date of Patent: Aug. 18, 2009

(54) METHOD OF PREDICTING SALES BASED ON TRIPLE-AXIS MAPPING OF CUSTOMER VALUE

(75) Inventors: Koji Watarai, Tokyo (JP); Tetsuya Kawai, Tokyo (JP)

(73) Assignee: Dentsu Tec Inc., Tokyo (JP)

( * ) Notice: Subject to any disclaimer, the term of this patent is extended or adjusted under 35 U.S.C. 154(b) by 1150 days.

(21) Appl. No.: 10/478,376

(22) PCT Filed: Apr. 26, 2002

(86) PCT No.: PCT/JP02/04289

§ 371 (c)(1),
(2), (4) Date: Nov. 21, 2003

(87) PCT Pub. No.: WO02/099711

PCT Pub. Date: Dec. 12, 2002

(65) Prior Publication Data

US 2004/0138958 A1      Jul. 15, 2004

(30) Foreign Application Priority Data

May 31, 2001    (JP) .............................. 2001-165325

(51) Int. Cl.
*G06Q 10/00*     (2006.01)

(52) U.S. Cl. ...................................................... 705/10

(58) Field of Classification Search ..................... 705/10

See application file for complete search history.

(56) References Cited

U.S. PATENT DOCUMENTS 6,216,129 B1 *    4/2001    Eldering ................... 705/36 R (Continued)

FOREIGN PATENT DOCUMENTS

EP            1035485 A2      2/2000

(Continued)

OTHER PUBLICATIONS

Stephen G. Eick "Visualizing multi-dimensional data" vol. 34, Issue 1 (Feb. 2000), ACM SIGGRAPH Computer Graphics archive, ISSN:0097-8930, pp. 61-67.*

(Continued)

*Primary Examiner*—Jonathan G Sterrett
(74) *Attorney, Agent, or Firm*—Lowe Hauptman Ham & Berner, LLP

(57) ABSTRACT

One object of the present invention is to provide a method for determining the current value and future value of customers who purchase specific merchandise, and the resources thereof, in order to provide data by which to select effective sales-promotion investments suitable for such customers, and for predicting sales according to the target and conditions of the investments. A sales-predicting method that classifies customers are into customer-value cells that determine the magnitude of current and future customer value and resources for future customer value, based on purchase data for specific merchandise and using three axes, including a purchase-amount index (first axis), a user-type index (second axis), and a customer-purchase-relevance index (third axis), and that measures changes in the customer-asset cells over time and changes due to sales-promotion investments, and that simulates sales by quantifying causal relationships between sales-promotion investments and sales.

14 Claims, 11 Drawing Sheets

U.S. PATENT DOCUMENTS 6,298,342 B1 * 10/2001 Graefe et al. .................. 707/4
7,007,029 B1 *  2/2006 Chen ........................... 707/100

FOREIGN PATENT DOCUMENTS

| JP | 934873 A | 2/1997 |
| JP | 10124732 A | 5/1998 |
| JP | 20003394 A | 1/2000 |
| JP | 2000187690 A | 7/2000 |
| JP | 200192840 A | 4/2001 |

OTHER PUBLICATIONS

Liu, Chengwen; Ursu, Andrei; "A framework for global optimization of aggregate queries", 1997, Proceedings of the sixth international conference on Information and knowledge management, pp. 262-269.*

Web.archive.org webpage of Feb. 19, 1999 of virtualinsights.com, pp. 1.*

Tolkin, S; "Aggregation everywhere: data reduction and transformation in the Phoenix data warehouse", 1999, Proceedings of the 2nd ACM international workshop on Data warehousing and OLAP, pp. 79-86.*

Gray et al; "Data Cube: A Relational Aggregation Operator Generalizing Group-By, Cross-Tab, and Sub-Totals", May 1997, article retrieved from research.microsoft.com at: http://research.microsoft.com/research/pubs/view.aspx?tr_id=144.*

Chezare; "B2B Marketing-Kokyaku Kachi no Kojo ni Kokensuru 7-tsu no Process" first edition, Diamond Inc.; Nov. 2, 2000; pp. 85-89.

Hakuhodo Inc.; "Zukai de Wakaru Brand Marketing" first edition, Nihon Noritsu Management Center; Dec. 1, 2000; pp. 194-195.

HR Institute; "Marketing no Know-how Do-how"; Dai Ippan, PHP Kenkyusho; Nov. 15, 2000; pp. 53-61.

* cited by examiner

Fig.2 Steps in the method of determining customer value with three indices (Part 1)

S21: Purchase-history data is collected via the following routes (a),(b), and (c) each time a customer purchases merchandise of specific manufacturers or brands in a specific market.
Route (a) is a transmission path from the sales terminals 3 to the computer system 1 via the communications circuit 2.
Route (b) is a transmission path from a Web-page input screen on a customer terminal 4 to the computer system 1 via the communications circuit 2.
Route (c) is a path for inputting data via a terminal 14 of the computer system 1 using data on a form created through direct transactions with a customer S22: This data is accumulated one by one in the customer-purchase-history database 12a of the computer system 1

S23: Using the analyzing program 10a, the processing server 10 of the computer system 1 begins to generate a current customer-value map by classifying customers in the order described below for each specified period (a period of about 3 months or 6 months).

S24: Amounts expended by customers in a specified period t are tabulated and placed in order by amount, based on the database 12a, and customers are listed in order in m categories of amounts expended on purchases, from the highest amount to the least.

Customers are classified in at least 3 categories; heavy-level purchasers (H), medium-level purchasers (M), and light-level purchasers (L).

(Generate purchase-amount index)

S25: Customers who purchase major or related types of specific products in the specified period t are classified in n categories of user type, based on product-combination data stored in the database 12a, from customers who purchase the majority of major merchandise to customers who purchase 0 or 1 kind type of such merchandise.

The sis categories include (ABC), (AB), (AC), (A), (B), and (C).

(Generate user-type index)

*Steps in the sales-predicting device based on triple-axis mapping of customer value (Part 2)*

(A)

S31
The customers are divided into m x n cells (3 x 6 cells in this example) according to the customer-amount index and the user-type index.

S32
A current customer-value map is generated based on the database 12a by calculating numerical data indicating the structure and purchasing status of customer groups for each cell.

(Create current customer-value map)

S33
This marketing approach comprises: (1) a relevance classification (a) in which customers are classified according to amounts expended on purchases within a specified period into one of three categories (H), (M), or (L), based on data abstracted from the total manufacturer/brand customer-purchase-history database 12b; (2) a relevance classification (b) for user type whereby customers are classified by user type into one of seven categories, including the six categories (ABC), (AB), (AC), (A), (B), and (c) and an additional category (D) for customers who also purchase products of other manufacturers and brands; and (3) a sales-correspondence approach (c) in which the terminal 14 outputs sales correspondence such as questionnaires via direct mail, e-mail, and telephone to customers of each cell.

S34
After sales correspondence is distributed to the customers, customer data is recorded in the total manufacturer/brand customer-purchase-history database 12b for a specified period Z (for example, about 2-3 months) following the beginning of the marketing approach.

(Generate customer-purchase-relevance index)

S35
A map of customer value is generated for the specified period Z based on the data stored in the total manufacturer/brand customer-purchase-history database 12b. Future data is predicted by comparing the current customer-value map to data prior to the marketing approach and creating a future customer-value map by calculating the percentage of repeat customers, ex-customers, and new customers for each cell and the percentage of increase or decrease in the total number of customers and total sales for the specific merchandise.

(Generate future customer-value map)

Fig. 4 (a) Current customer-value map

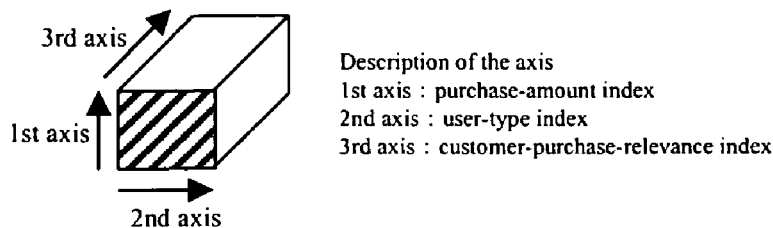

Description of the axis
1st axis : purchase-amount index
2nd axis : user-type index
3rd axis : customer-purchase-relevance index (b)

|  |  | User-type index | | | | | | Total |
|---|---|---|---|---|---|---|---|---|
|  |  | Customer category (C) | Customer category (B) | Customer category (A) | Customer category (AC) | Customer category (AB) | Customer category (ABC) |  |
| Purchase-amount index | H category | 0.0%<br>0.0%<br>¥0<br>.0 times | 0.5%<br>1.4%<br>¥36,104<br>23.2times | 1.8%<br>2.2%<br>¥32,978<br>17.5times | 2.3%<br>2.9%<br>¥35,325<br>20.1times | 6.3%<br>16.6%<br>¥43,555<br>21.4times | 3.7%<br>26.9%<br>¥54,139<br>24.4times | 14.5%<br>50.0%<br>¥48,854<br>23.1times |
|  | M category | 1.8%<br>1.8%<br>¥12,277<br>6.4times | 1.7%<br>2.3%<br>¥14,022<br>12.2times | 2.4%<br>2.8%<br>¥14,256<br>8.8times | 4.6%<br>5.0%<br>¥14,932<br>8.8times | 10.8%<br>13.5%<br>¥16,166<br>9.5times | 1.7%<br>4.6%<br>¥18,150<br>10.0times | 23.0%<br>30.1%<br>¥15,749<br>9.9times |
|  | L category | 10.8%<br>2.7%<br>¥2,026<br>3.3times | 24.6%<br>0.1%<br>¥3,652<br>5.3times | 15.3%<br>7.6%<br>¥4,631<br>4.3times | 4.6%<br>3.8%<br>¥6,338<br>5.1times | 5.7%<br>4.5%<br>¥6,628<br>4.9times | 1.5%<br>1.3%<br>¥7,762<br>6.1times | 62.5%<br>20.0%<br>¥3,915<br>4.7times |
| Total | | 12.5%<br>4.5%<br>¥2,113<br>3.3times | 26.8%<br>3.8%<br>¥5,265<br>6.3times | 19.4%<br>12.6%<br>¥7,006<br>5.4times | 11.4%<br>11.7%<br>¥13,171<br>8.3times | 22.8%<br>34.7%<br>¥20,349<br>11.2times | 7.0%<br>32.8%<br>¥38,890<br>18.3times | 100.0%<br>100.0%<br>¥12,452<br>8.3times |

Description of cell data
1st item : customer component percentage
2nd item : expenditure-amount component percentage
3rd item : amount expended per person
4th item : store visit per person Total members: 34,367
Total expenditures: ¥427,928,827
Period of data collection: July 1, 2000–
September 30, 2000

Fig. 5  (a)

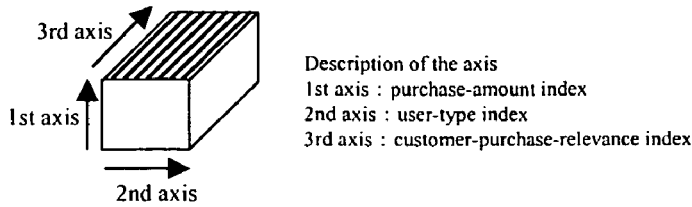

Description of the axis
1st axis : purchase-amount index
2nd axis : user-type index
3rd axis : customer-purchase-relevance index (b)

| | | User-type index | | | | | | | Total | |
|---|---|---|---|---|---|---|---|---|---|---|
| | | Customer category (C) | Customer category (B) | Customer category (A) | Customer category (AC) | Customer category (AB) | Customer category (ABC) | | | |
| Customer-purchase-relevance index | H category | (ABC) | 0.8%  ¥2,096  0.3%  3.2times | 1.6%  ¥6,306  0.3%  7.4times | 1.3%  ¥7,373  0.9%  5.5times | 0.8%  ¥16,811  1.0%  10.7times | 2.7%  ¥30,494  6.1%  15.7times | 4.5%  ¥50,838  27.7%  23.2times | | 11.7%  ¥34,483  36.3%  17.0times |
| | | (AB) | 0.0%  ¥0  0.0%  0 | 1.4%  ¥5,716  0.2%  7.1times | 1.0%  ¥6,716  0.6%  4.7times | 0.0%  ¥0  0.0%  0times | 5.1%  ¥36,900  4.1%  18.5times | 0.0%  ¥0  0.0%  0times | | 7.5%  ¥24,376  15.0%  13.6times |
| | | (AC) | 0.7%  ¥2,569  0.3%  3.4times | 0.0%  ¥0  0.0%  0times | 0.7%  ¥7,446  0.5%  5.8times | 1.6%  ¥22,073  2.8%  12.9times | 0.0%  ¥0  0.0%  0times | 0.0%  ¥0  0.0%  0times | | 3.0%  ¥10,839  3.5%  7.5times |
| | | (A) | 0.0%  ¥0  0.0%  0times | 0.0%  ¥0  0.0%  0times | 1.0%  ¥9,975  1.0%  6.8times | 0.0%  ¥0  0.0%  0times | 0.0%  ¥0  0.0%  0times | 0.0%  ¥0  0.0%  0times | | 1.0%  ¥9,975  1.0%  6.8times |
| | | (B) | 0.0%  ¥0  0.0%  0times | 1.0%  ¥12,459  0.3%  9.6times | 0.0%  ¥0  0.0%  0times | 0.0%  ¥0  0.0%  0times | 0.0%  ¥0  0.0%  0times | 0.0%  ¥0  0.0%  0times | | 1.0%  ¥12,459  0.3%  9.6times |
| | | (C) | 0.4%  ¥2,820  0.2%  3.8times | 0.0%  ¥0  0.0%  0times | 0.0%  ¥0  0.0%  0times | 0.0%  ¥0  0.0%  0times | 0.0%  ¥0  0.0%  0times | 0.0%  ¥0  0.0%  0times | | 0.4%  ¥2,820  0.2%  3.8times |
| | | (AD) | 0.0%  ¥0  0.0%  0times | 0.0%  ¥0  0.0%  0times | 0.6%  ¥11,213  0.6%  7.3times | 0.0%  ¥0  0.0%  0times | 0.0%  ¥0  0.0%  0times | 0.0%  ¥0  0.0%  0times | | 0.6%  ¥11,213  0.6%  7.3times |
| | M category | (ABC) | 2.6%  ¥2,116  0.9%  3.4times | 5.2%  ¥4,794  0.7%  5.9times | 1.0%  ¥7,244  0.7%  5.7times | 1.9%  ¥10,899  1.6%  7.3times | 3.5%  ¥13,119  3.4%  7.9times | 2.3%  ¥17,939  5.0%  9.7times | | 16.5%  ¥9,046  12.3%  6.8times |
| | | (AB) | 0.0%  ¥0  0.0%  0 | 3.5%  ¥6,912  0.6%  7.3times | 0.9%  ¥9,639  0.8%  6.1times | 0.0%  ¥0  0.0%  0times | 9.4%  ¥14,100  0.0%  8.5times | 0.0%  ¥0  0.0%  0times | | 13.8%  ¥11,122  11.4%  7.9times |
| | | (AC) | 1.3%  ¥1,990  0.4%  3.7times | 0.0%  ¥0  0.0%  0times | 1.8%  ¥9,850  1.6%  6.6times | 5.5%  ¥12,810  5.5%  7.8times | 0.0%  ¥0  0.0%  0times | 0.0%  ¥0  0.0%  0times | | 8.7%  ¥9,286  7.6%  6.4times |
| | | (A) | 0.0%  ¥0  0.0%  0 | 0.0%  ¥0  0.0%  0times | 1.0%  ¥10,296  0.9%  6.7times | 0.0%  ¥0  0.0%  0times | 0.0%  ¥0  0.0%  0times | 0.0%  ¥0  0.0%  0times | | 1.0%  ¥10,296  0.9%  6.7times |
| | | (B) | 0.0%  ¥0  0.0%  0times | 5.6%  ¥5,487  0.8%  6.3times | 0.0%  ¥0  0.0%  0times | 0.0%  ¥0  0.0%  0times | 0.0%  ¥0  0.0%  0times | 0.0%  ¥0  0.0%  0times | | 5.6%  ¥5,487  0.8%  6.3times |
| | | (C) | 2.5%  ¥2,117  0.9%  3.1times | 0.0%  ¥0  0.0%  0times | 0.0%  ¥0  0.0%  0times | 0.0%  ¥0  0.0%  0times | 0.0%  ¥0  0.0%  0times | 0.0%  ¥0  0.0%  0times | | 2.5%  ¥2,117  0.9%  3.1times |
| | | (AD) | 0.0%  ¥0  0.0%  0times | 0.0%  ¥0  0.0%  0times | 2.0%  8,016  1.5%  6.2times | 0.0%  ¥0  0.0%  0times | 0.0%  ¥0  0.0%  0times | 0.0%  ¥0  0.0%  0times | | 2.0%  ¥8,016  1.5%  6.2times |
| | L category | (ABC) | 1.4%  ¥2,057  0.5%  3.0times | 2.6%  ¥3,757  0.3%  5.3times | 2.0%  ¥4,698  0.9%  4.4times | 0.7%  ¥6,506  0.4%  5.7times | 1.1%  ¥6,727  0.5%  4.6times | 0.2%  ¥7,830  0.2%  6.5times | | 7.9%  ¥4,301  2.7%  4.8times |
| | | (AB) | 0.0%  ¥0  0.0%  0 | 3.2%  ¥3,695  0.3%  5.5times | 2.0%  ¥4,569  0.9%  4.3times | 0.0%  ¥0  0.0%  0times | 1.0%  ¥6,444  0.5%  4.8times | 0.0%  ¥0  0.0%  0times | | 6.2%  ¥4,198  1.6%  5.2times |
| | | (AC) | 1.7%  ¥1,932  0.5%  3.1times | 0.0%  ¥0  0.0%  0times | 1.5%  4,733  0.7%  4.0times | 0.9%  6,210  0.4%  4.7times | 0.0%  ¥0  0.0%  0times | 0.0%  ¥0  0.0%  0times | | 4.0%  3,605  1.6%  3.7times |
| | | (A) | 0.0%  ¥0  0.0%  0times | 0.0%  ¥0  0.0%  0times | 0.9%  ¥4,605  0.4%  4.6times | 0.0%  ¥0  0.0%  0times | 0.0%  ¥0  0.0%  0times | 0.0%  ¥0  0.0%  0times | | 0.9%  ¥4,605  0.4%  4.6times |
| | | (B) | 0.0%  ¥0  0.0%  0times | 2.8%  ¥3,556  0.3%  5.3times | 0.0%  ¥0  0.0%  0times | 0.0%  ¥0  0.0%  0times | 0.0%  ¥0  0.0%  0times | 0.0%  ¥0  0.0%  0times | | 2.8%  ¥3,556  0.3%  5.3times |
| | | (C) | 1.3%  ¥2,076  0.5%  3.5times | 0.0%  ¥0  0.0%  0times | 0.0%  ¥0  0.0%  0times | 0.0%  ¥0  0.0%  0times | 0.0%  ¥0  0.0%  0times | 0.0%  ¥0  0.0%  0times | | 1.3%  ¥2,076  0.5%  3.5times |
| | | (AD) | 0.0%  ¥0  0.0%  0times | 0.0%  ¥0  0.0%  0times | 1.7%  ¥4,549  0.7%  4.2times | 0.0%  ¥0  0.0%  0times | 0.0%  ¥0  0.0%  0times | 0.0%  ¥0  0.0%  0times | | 1.7%  ¥4,549  0.7%  4.2times |
| Total | | | 12.5%  ¥2,113  4.5%  3.3times | 26.8%  ¥5,265  3.8%  6.3times | 19.4%  ¥7,006  12.6%  5.4times | 11.4%  ¥13,171  11.7%  8.3times | 22.8%  ¥20,349  34.7%  11.2times | 7.0%  ¥38,890  32.8%  18.3times | | 100.0%  ¥12,452  100.0%  8.3times |

Description of cell data
1st item : customer component percentage
2nd item : expenditure-amount component percentage
3rd item : amount expended per person
4th item : store visit per person Total members: 34,367
Total expenditures: ¥427,928,827
Period of data collection: July 1, 2000–September 30, 2000

During the specified period Y

Fig. 8

During the specified period Z (a) 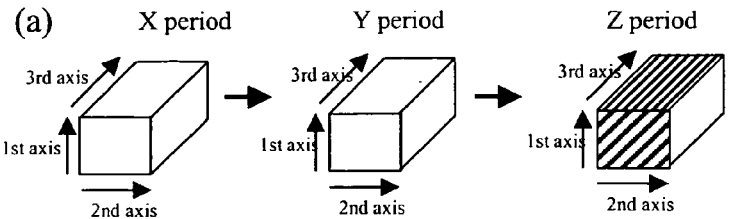

(b)

| | | User-type index | | | | | | Total |
|---|---|---|---|---|---|---|---|---|
| | | Customer category (C) | Customer category (B) | Customer category (A) | Customer category (AC) | Customer category (AB) | Customer category (ABC) | |
| Purchase-amount index | H category | 0.0%<br>0.0%<br>¥<br>.0times | 0.5%<br>1.4%<br>¥38,892<br>24.3times | 1.7%<br>2.1%<br>¥35,828<br>18.1times | 2.7%<br>3.9%<br>¥36,710<br>21.9times | 4.1%<br>7.8%<br>¥39,165<br>16.6times | 6.8%<br>37.3%<br>¥53,837<br>25.9times | 15.9%<br>52.6%<br>¥49,763<br>24.0times |
| | M category | 1.7%<br>1.7%<br>¥11,962<br>4.0times | 2.8%<br>3.3%<br>¥14,518<br>12.8times | 2.3%<br>2.7%<br>¥15,094<br>9.0times | 5.6%<br>6.0%<br>¥14,990<br>10.9times | 8.1%<br>8.9%<br>¥14,905<br>8.1times | 3.2%<br>5.2%<br>¥16,006<br>9.5times | 23.7%<br>27.9%<br>¥15,116<br>10.0times |
| | L category | 3.1%<br>1.6%<br>¥3,517<br>3.1times | 30.2%<br>0.5%<br>¥3,494<br>5.2times | 15.2%<br>7.3%<br>¥4,645<br>4.0times | 5.4%<br>4.2%<br>¥6,934<br>7.0times | 4.8%<br>4.0%<br>¥7,119<br>5.4times | 1.7%<br>1.8%<br>¥14,807<br>11.1times | 60.4%<br>19.4%<br>¥4,207<br>5.0times |
| Total | | 4.8%<br>3.3%<br>¥3,567<br>3.2times | 33.5%<br>5.3%<br>¥5,232<br>6.3times | 19.3%<br>12.1%<br>¥7,130<br>5.2times | 13.7%<br>14.2%<br>¥14,357<br>10.6times | 17.0%<br>20.8%<br>¥17,040<br>8.8times | 11.7%<br>44.4%<br>¥38,890<br>19.5times | 100.0%<br>100.0%<br>¥13,285<br>8.9times |

Description of cell data
1st item: customer component percentage
2nd item : expenditure-amount component percentage
3rd item : amount expended per person
4th item : store visit per person Total members: 34,480
Total expenditures: ¥471,353,138
Period of data collection:
January 1, 2001–March 31, 2001

(c)

| | | User-type index | | | | | | | | | | | | Total | |
|---|---|---|---|---|---|---|---|---|---|---|---|---|---|---|---|
| | | Customer category (C) | | Customer category (B) | | Customer category (A) | | Customer category (AC) | | Customer category (AB) | | Customer category (ABC) | | | |
| Customer-purchase-relevance index | H category (ABC) | 0.3%<br>0.2% | ¥3,539<br>3.1times | 2.0%<br>0.4% | ¥6,266<br>7.5times | 1.3%<br>0.9% | ¥7,503<br>5.3times | 0.9%<br>1.2% | ¥18,324<br>13.7times | 2.0%<br>3.7% | ¥25,536<br>12.4times | 7.6%<br>37.4% | ¥50,837<br>24.7times | 14.1%<br>43.8% | ¥37,325<br>19.1times |
| | (AB) | 0.0%<br>0.0% | ¥<br>.0times | 1.7%<br>0.3% | ¥5,680<br>7.1times | 1.0%<br>0.6% | ¥6,835<br>4.5times | 0.0%<br>0.0% | ¥<br>.0times | 3.8%<br>8.5% | ¥30,900<br>14.7times | 0.0%<br>0.0% | ¥<br>.0times | 6.5%<br>9.4% | ¥17,798<br>10.4times |
| | (AC) | 0.3%<br>0.2% | ¥4,337<br>3.3times | 0.0%<br>0.0% | ¥0<br>.0times | 0.7%<br>0.5% | ¥7,578<br>5.6times | 1.9%<br>3.4% | ¥24,060<br>16.6times | 0.0%<br>0.0% | ¥0<br>.0times | 0.0%<br>0.0% | ¥0<br>.0times | 2.9%<br>4.0% | ¥16,714<br>11.7times |
| | (A) | 0.0%<br>0.0% | ¥0<br>.0times | 0.0%<br>0.0% | ¥0<br>.0times | 1.0%<br>0.9% | ¥10,151<br>6.6times | 0.0%<br>0.0% | ¥0<br>.0times | 0.0%<br>0.0% | ¥0<br>.0times | 0.0%<br>0.0% | ¥0<br>.0times | 1.0%<br>0.9% | ¥10,151<br>6.6times |
| | (B) | 0.0%<br>0.0% | ¥0<br>.0times | 1.2%<br>0.4% | ¥12,381<br>9.7times | 0.0%<br>0.0% | ¥0<br>.0times | 0.0%<br>0.0% | ¥0<br>.0times | 0.0%<br>0.0% | ¥0<br>.0times | 0.0%<br>0.0% | ¥0<br>.0times | 1.2%<br>0.4% | ¥12,381<br>9.7times |
| | (C) | 0.1%<br>0.1% | ¥4,761<br>3.6times | 0.0%<br>0.0% | ¥0<br>.0times | 0.0%<br>0.0% | ¥0<br>.0times | 0.0%<br>0.0% | ¥0<br>.0times | 0.0%<br>0.0% | ¥0<br>.0times | 0.0%<br>0.0% | ¥0<br>.0times | 0.1%<br>0.1% | ¥4,761<br>3.6times |
| | (AD) | 0.0%<br>0.0% | ¥0<br>.0times | 0.0%<br>0.0% | ¥0<br>.0times | 0.6%<br>0.6% | ¥11,411<br>7.0times | 0.0%<br>0.0% | ¥0<br>.0times | 0.0%<br>0.0% | ¥0<br>.0times | 0.0%<br>0.0% | ¥0<br>.0times | 0.6%<br>0.4% | ¥11,411<br>7.0times |
| | M category (ABC) | 1.0%<br>0.7% | ¥3,572<br>3.3times | 6.5%<br>0.9% | ¥4,764<br>6.0times | 1.0%<br>0.6% | ¥7,372<br>5.5times | 2.3%<br>2.0% | ¥11,879<br>9.4times | 2.6%<br>2.0% | ¥10,986<br>6.2times | 3.8%<br>6.7% | ¥17,939<br>10.4times | 17.3%<br>13.0% | ¥9,779<br>7.4times |
| | (AB) | 0.0%<br>0.0% | ¥0<br>.0times | 4.3%<br>0.9% | ¥6,868<br>7.3times | 0.9%<br>0.8% | ¥9,810<br>5.8times | 0.0%<br>0.0% | ¥0<br>.0times | 7.0%<br>6.0% | ¥11,808<br>6.7times | 0.0%<br>0.0% | ¥0<br>.0times | 12.3%<br>7.6% | ¥9,213<br>7.0times |
| | (AC) | 0.5%<br>0.3% | ¥3,358<br>3.5times | 0.0%<br>0.0% | ¥0<br>.0times | 1.8%<br>1.6% | ¥10,024<br>6.4times | 6.6%<br>6.7% | ¥13,962<br>10.0times | 0.0%<br>0.0% | ¥0<br>.0times | 0.0%<br>0.0% | ¥0<br>.0times | 8.9%<br>8.6% | ¥12,257<br>8.6times |
| | (A) | 0.0%<br>0.0% | ¥0<br>.0times | 0.0%<br>0.0% | ¥0<br>.0times | 1.0%<br>0.9% | ¥10,479<br>6.5times | 0.0%<br>0.0% | ¥0<br>.0times | 0.0%<br>0.0% | ¥0<br>.0times | 0.0%<br>0.0% | ¥0<br>.0times | 1.0%<br>0.9% | ¥10,479<br>6.5times |
| | (B) | 0.0%<br>0.0% | ¥0<br>.0times | 7.0%<br>1.1% | ¥5,452<br>6.4times | 0.0%<br>0.0% | ¥0<br>.0times | 0.0%<br>0.0% | ¥0<br>.0times | 0.0%<br>0.0% | ¥0<br>.0times | 0.0%<br>0.0% | ¥0<br>.0times | 7.0%<br>1.1% | ¥5,452<br>6.4times |
| | (C) | 0.9%<br>0.7% | ¥3,574<br>2.9times | 0.0%<br>0.0% | ¥0<br>.0times | 0.0%<br>0.0% | ¥0<br>.0times | 0.0%<br>0.0% | ¥0<br>.0times | 0.0%<br>0.0% | ¥0<br>.0times | 0.0%<br>0.0% | ¥0<br>.0times | 0.9%<br>0.7% | ¥3,574<br>2.9times |
| | (AD) | 0.0%<br>0.0% | ¥0<br>.0times | 0.0%<br>0.0% | ¥0<br>.0times | 2.0%<br>1.4% | ¥8,158<br>6.0times | 0.0%<br>0.0% | ¥0<br>.0times | 0.0%<br>0.0% | ¥0<br>.0times | 0.0%<br>0.0% | ¥0<br>.0times | 2.0%<br>1.4% | ¥8,158<br>6.0times |
| | L category (ABC) | 0.5%<br>0.4% | ¥3,473<br>2.9times | 3.2%<br>0.4% | ¥3,734<br>5.3times | 2.0%<br>0.8% | ¥4,782<br>4.2times | 0.9%<br>0.5% | ¥7,091<br>7.4times | 0.8%<br>0.3% | ¥5,633<br>3.6times | 0.3%<br>0.2% | ¥7,830<br>6.9times | 7.7%<br>2.6% | ¥4,501<br>5.1times |
| | (AB) | 0.0%<br>0.0% | ¥0<br>.0times | 4.0%<br>0.4% | ¥3,672<br>5.6times | 2.0%<br>0.8% | ¥4,650<br>4.2times | 0.0%<br>0.0% | ¥0<br>.0times | 0.7%<br>0.3% | ¥5,396<br>3.8times | 0.0%<br>0.0% | ¥0<br>.0times | 6.7%<br>1.5% | ¥4,000<br>5.1times |
| | (AC) | 0.6%<br>0.4% | ¥3,261<br>3.0times | 0.0%<br>0.0% | ¥0<br>.0times | 1.5%<br>0.6% | ¥4,817<br>3.8times | 1.0%<br>0.5% | ¥6,768<br>6.1times | 0.0%<br>0.0% | ¥0<br>.0times | 0.0%<br>0.0% | ¥0<br>.0times | 3.2%<br>1.5% | ¥5,064<br>4.2times |
| | (A) | 0.0%<br>0.0% | ¥0<br>.0times | 0.0%<br>0.0% | ¥0<br>.0times | 0.8%<br>0.3% | ¥4,687<br>4.4times | 0.0%<br>0.0% | ¥0<br>.0times | 0.0%<br>0.0% | ¥0<br>.0times | 0.0%<br>0.0% | ¥0<br>.0times | 0.8%<br>0.3% | ¥4,687<br>4.4times |
| | (B) | 0.0%<br>0.0% | ¥0<br>.0times | 3.5%<br>0.4% | ¥3,534<br>5.3times | 0.0%<br>0.0% | ¥0<br>.0times | 0.0%<br>0.0% | ¥0<br>.0times | 0.0%<br>0.0% | ¥0<br>.0times | 0.0%<br>0.0% | ¥0<br>.0times | 3.5%<br>0.4% | ¥3,534<br>5.3times |
| | (C) | 0.5%<br>0.3% | ¥3,504<br>3.3times | 0.0%<br>0.0% | ¥0<br>.0times | 0.0%<br>0.0% | ¥0<br>.0times | 0.0%<br>0.0% | ¥0<br>.0times | 0.0%<br>0.0% | ¥0<br>.0times | 0.0%<br>0.0% | ¥0<br>.0times | 0.5%<br>0.3% | ¥3,504<br>3.3times |
| | (AD) | 0.0%<br>0.0% | ¥0<br>.0times | 0.0%<br>0.0% | ¥0<br>.0times | 1.6%<br>0.7% | ¥4,629<br>4.0times | 0.0%<br>0.0% | ¥0<br>.0times | 0.0%<br>0.0% | ¥0<br>.0times | 0.0%<br>0.0% | ¥0<br>.0times | 1.6%<br>0.7% | ¥4,629<br>4.0times |
| Total | | 4.8%<br>3.3% | ¥3,567<br>3.2times | 33.5%<br>5.3% | ¥5,232<br>6.3times | 19.3%<br>12.1% | ¥7,130<br>5.2times | 13.7%<br>14.2% | ¥14,357<br>10.6times | 17.0%<br>20.8% | ¥17,040<br>8.8times | 11.7%<br>44.4% | ¥38,890<br>19.5times | 100.0%<br>100.0% | ¥13,285<br>8.9times |

Description of cell data
1st item:
customer component percentage
2nd item : expenditure-amount component percentage
3rd item : amount expended per person
4th item : store visit per person Total members: 34,480
Total expenditures: ¥471,353,138
Period of data collection:
January 1, 2001–March 31, 2001

Practical example of the indirect effect by this approach

Fig. 9 (a) Y period

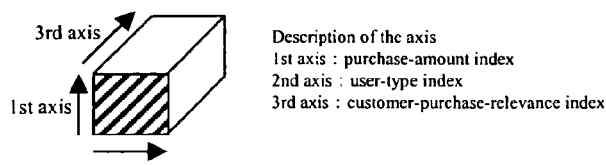

Description of the axis
1st axis : purchase-amount index
2nd axis : user-type index
3rd axis : customer-purchase-relevance index (b)

| | | User-type index | | | | | | Total |
|---|---|---|---|---|---|---|---|---|
| | | Customer category (C) | Customer category (B) | Customer category (A) | Customer category (AC) | Customer category (AB) | Customer category (ABC) | |
| Purchase-amount index | H category | 0.0% | 0.6% | 1.7% | 4.1% | 4.2% | 44.8% | 55.3% |
| | | 0.0% | 0.8% | 2.2% | 4.5% | 5.3% | 76.6% | 89.3% |
| | | ¥ | ¥48,130 | ¥42,190 | ¥37,725 | ¥45,174 | ¥62,635 | ¥60,826 |
| | | .0times | 27.9times | 17.6times | 22.3times | 19.2times | 29.7times | 29.0times |
| | M category | 0.0% | 1.7% | 0.6% | 3.6% | 5.4% | 4.8% | 16.0% |
| | | 0.0% | 1.1% | 0.0% | 2.6% | 3.8% | 2.9% | 10.5% |
| | | ¥ | ¥15,955 | ¥16,678 | ¥17,564 | ¥18,057 | ¥20,346 | ¥18,529 |
| | | .0times | 11.6times | 9.2times | 11.5times | 9.7times | 14.1times | 12.1times |
| | L category | 0.0% | 4.2% | 3.3% | 0.1% | 1.9% | 1.1% | 10.6% |
| | | 0.0% | 0.1% | 0.1% | 0.0% | 0.0% | 0.0% | 0.2% |
| | | ¥ | ¥4,837 | ¥5,182 | ¥6,469 | ¥6,429 | ¥6,671 | ¥5,221 |
| | | .0times | 6.1times | 4.6times | 8.4times | 5.4times | 3.6times | 5.7times |
| Total | | 0.0% | 6.6% | 5.5% | 7.7% | 11.5% | 50.6% | 81.9% |
| | | 0.0% | 2.0% | 2.3% | 7.1% | 9.1% | 79.5% | 100.0% |
| | | ¥ | ¥11,949 | ¥10,781 | ¥24,321 | ¥25,773 | ¥57,288 | ¥39,385 |
| | | .0times | 9.6times | 6.7times | 15.4times | 12.4times | 27.8times | 19.6times |

18.1% stopped purchasing altogether

Practical example of the indirect effect by this approach

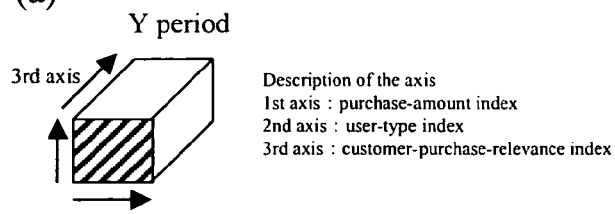

Description of the axis
1st axis : purchase-amount index
2nd axis : user-type index
3rd axis : customer-purchase-relevance index (b)

|  |  | User-type index ||||||  Total  |
|---|---|---|---|---|---|---|---|---|
|  |  | Customer category (C) | Customer category (B) | Customer category (A) | Customer category (AC) | Customer category (AB) | Customer category (ABC) |  |
| Purchase-amount index | H category | 0.0% | 0.1% | 1.8% | 2.2% | 6.1% | 3.8% | 14.0% |
|  |  | 0.0% | 0.4% | 3.1% | 3.2% | 19.8% | 18.1% | 44.6% |
|  |  | ¥ | ¥43,957 | ¥37,019 | ¥36,079 | ¥37,544 | ¥40,882 | ¥39,382 |
|  |  | .0times | 24.0times | 18.4times | 18.6times | 17.7times | 21.5times | 19.9times |
|  | M category | 0.0% | 2.7% | 3.0% | 2.6% | 13.3% | 4.2% | 25.9% |
|  |  | 0.0% | 4.3% | 5.7% | 4.5% | 23.4% | 8.2% | 46.1% |
|  |  | ¥ | ¥14,371 | ¥15,309 | ¥16,815 | ¥16,614 | ¥20,095 | ¥16,786 |
|  |  | .0times | 14.9times | 9.6times | 14.6times | 10.8times | 14.4times | 12.0times |
|  | L category | 0.1% | 7.4% | 7.4% | 0.4% | 3.1% | 1.3% | 19.7% |
|  |  | 0.0% | 3.3% | 3.4% | 0.2% | 1.5% | 0.7% | 9.2% |
|  |  | ¥3,248 | ¥4,453 | ¥5,147 | ¥5,952 | ¥6,968 | ¥8,143 | ¥5,106 |
|  |  | 4.0times | 6.2times | 5.2times | 8.0times | 6.1times | 10.4times | 5.9times |
| Total || 0.1% | 10.2% | 12.1% | 5.2% | 22.5% | 9.3% | 59.6% |
|  || 0.0% | 8.1% | 12.2% | 7.9% | 44.7% | 27.1% | 100.0% |
|  || ¥3,248 | ¥7,303 | ¥9,607 | ¥16,401 | ¥20,446 | ¥31,523 | ¥9,134 |
|  || 4.0times | 8.5times | 7.1times | 13.7times | 11.9times | 18.3times | 6.0times |

40.4% stopped purchasing altogether

|  |  | User-type index ||||||  Total |
|---|---|---|---|---|---|---|---|---|
|  |  | Customer category (C) | Customer category (B) | Customer category (A) | Customer category (AC) | Customer category (AB) | Customer category (ABC) |  |
| Purchase-amount index | H category | 0.0% | 0.1% | 1.1% | 2.2% | 3.3% | 5.7% | 12.3% |
|  |  | 0.0% | 0.5% | 2.7% | 5.3% | 8.0% | 22.0% | 38.5% |
|  |  | ¥ | ¥33,301 | ¥36,350 | ¥34,616 | ¥37,056 | ¥45,616 | ¥42,999 |
|  |  | .0times | 16.7times | 18.3times | 16.7times | 14.1times | 17.6times | 16.8times |
|  | M category | 0.0% | 3.6% | 1.4% | 3.3% | 7.4% | 5.3% | 21.1% |
|  |  | 0.0% | 5.5% | 2.9% | 5.7% | 13.5% | 12.9% | 40.5% |
|  |  | ¥11,962 | ¥13,348 | ¥13,823 | ¥14,506 | ¥15,041 | ¥17,456 | ¥15,190 |
|  |  | 4.0times | 8.6times | 6.8times | 7.6times | 6.6times | 7.9times | 7.5times |
|  | L category | 3.1% | 38.9% | 15.6% | 2.7% | 5.6% | 0.8% | 66.6% |
|  |  | 0.8% | 11.2% | 5.2% | 0.9% | 2.2% | 0.7% | 20.9% |
|  |  | ¥3,426 | ¥3,242 | ¥4,486 | ¥6,230 | ¥6,494 | ¥7,387 | ¥3,834 |
|  |  | 3.0times | 4.2times | 3.5times | 4.9times | 4.3times | 6.1times | 4.1times |
| Total || 3.1% | 42.6% | 18.1% | 8.2% | 16.2% | 11.8% | 100.0% |
|  || 0.8% | 17.2% | 10.8% | 11.9% | 23.7% | 35.6% | 100.0% |
|  || ¥3,481 | ¥3,989 | ¥5,766 | ¥10,982 | ¥13,753 | ¥27,150 | ¥8,025 |
|  || 3.0times | 4.6times | 4.0times | 6.5times | 6.4times | 11.4times | 5.4times |

METHOD OF PREDICTING SALES BASED ON TRIPLE-AXIS MAPPING OF CUSTOMER VALUE

DETAILED DESCRIPTION OF THE INVENTION

1. Field of the Ivention

The present invention relates to a method of predicting sales based on triple-axis mapping of customer value. With this method, sales of the merchandise of sales of specific manufacturers or specific brands in a specific market is analyzed by accumulating in a database the purchase-history data for customers as customers purchase this merchandise. The method generates a current customer value map based on the purchase-history data stored in the database. On the map, customers are classified into "cells" according to purchase-amount categories sorted according to customer purchase sum or quantity of merchandise purchased and user-type categories sorted according to the number of types of merchandise of a specific manufacturer or a specific brand purchased by a customer in a specified period. The classifications of user types estimated from the purchase sum, quantity, and other details regarding purchases of all manufacturers' and brands' of merchandise in a given market are quantified based on purchase history, including questionnaire data collected at points of sale, membership credit cards affiliated with businesses in various industries, or electronic transactions. The customers are sorted into cells according to the above-described purchase-amount category and user-type category, and then marketing approaches, such as the sending of direct mail, are implemented so as to target each cell. Based on customer movement among cells and increases and decreases of the numbers of customers in cells, it is possible to determine future customer value and future increases in overall sales for each cell, enabling one to analyze—based only on purchase data for products of one's own company—whether it will be possible to expand one's market share for such products.

2. Description of the Related Art

Conventionally it has been impossible to learn the market share of other companies' specific products or specific brands in specific markets (for example, Cosmetic Lotion Y produced by Company X) based solely on one's own market share. Although there is a need to predict future customer value so as to analyze the possibility of expanding one's market share, little thought has gone into this conventional problem.

Conventional marketing approaches based solely on data regarding only one's own company's sales employ RFM or RFMI (recency, frequency, monetary, item) based on the current value of customers. These approaches assume that customers with good current value will maintain that value in the future.

However, that is not always the case. To develop an effective marketing approach, it is necessary to learn not only the current value of customers in terms of purchase sums and quantities, but also their potential future value, in order to determine the market share of one's own company in relation to products of all manufacturers and brands in a specific market. The future value of customers can be determined through interviews with clerks at sales outlets, questionnaires, and the like. It is also necessary to determine potential resources of future value by studying the various combinations of products purchased by customers.

In order to find an efficient marketing approach (direct mail, etc.), One must analyze whether there has been customer response to previous marketing approaches.

In view of the foregoing, the present invention has the following objectives.

One object of the present invention to provide a method for determining the current value and future value of customers who purchase specific merchandise, and the potential resources thereof, for providing data to select effective sales-promotion investments suitable for such customers, and for predicting sales according to the target and conditions of the investments.

DISCLOSURE OF THE INVENTION

The above objective and others will be attained by a sales-predicting method based on triple-axis mapping of customer value by employing (1) a customer-value-determination method that uses a customer value-analyzing computer system of an institute that collects in a database purchase-history data and then analyzes that data, (2) a sales-predicting method comprised of the steps of sorting customers into customer-value cells that determine the amount of current and future customer value and resources for future customer value, based on specific-merchandise purchase data collected in the aforementioned database, (3) using a combination of three axes, including a purchase-amount index (first axis), a user-type index (second axis), and a customer-purchase-relevance index (third axis); (4) measuring changes in the customer-asset cells over time and changes due to sales-promotion investments; and (5) simulating sales by quantifying causal relationships between sales-promotion investments and sales.

Further, the purchase-amount index (first axis) serves to classify customers in a plurality of classifications in order of purchase sum or purchase quantity, based on purchase-history data collected for a prescribed period, with said purchase-history data including at least (1) a customer name or customer code, (2) a product code, (3) the quantity of each item purchased, (4) the monetary sum of items purchased, and (5) the time of purchase. Said data is collected regarding transactions of sales outlets, electronic transactions conducted via the Internet, and direct transactions between a manufacturer and customers, including transactions by telephone and mail when customers purchase products of a specific manufacturer or brand in a specific market. The user-type index (second axis) serves to classify customers into a plurality of classifications according to user type determined by merchandise combinations from customers who purchase the majority of types of merchandise to customers who purchase 0 to 1 types of merchandise, by combining a plurality of types of merchandise by specific manufacturers or brands purchased in a specified time period. The customer-purchase-relevance index (third axis) indexes the user type classifications extrapolated from purchase sums, quantities, and other purchase details for products of all manufacturers and brands, including those of other manufacturers and brands, in a specific market, the extrapolated purchase data including product purchase history of membership credit cards having a common id and affiliated with a plurality of businesses in various industries, as well as data obtained through questionnaires and/or marketing approaches at sales outlets, questionnaires and/or marketing approaches in electronic transactions and direct transactions, questionnaires and/or marketing approaches by direct mail, e-mail, and telephone, and customer data on sales clerks. The sales-predicting method comprises the steps of determining the magnitude of current and future customer value and resources thereof for products of specific manufacturers or brands using the triple-axis combination, providing data for selecting effective investments for sales promotion suited to the customers, and providing a method for predicting sales based on the target and conditions of the investments.

Further, the customer-purchase relevance is the third index for classifying customers in a plurality of classifications based on abstracted data according to the monetary sum or quantity of purchases in a specified period for merchandise of all manufacturers or brands in a specific market, and for combining a plurality of types of merchandise and classifying customers in a plurality of classifications according to the merchandise combinations, from customers who purchase the majority of types of merchandise to customers who purchase 0 to 1 types of merchandise.

Further, a sales-predicting method based on triple-axis mapping of customer value employing a customer-value-analyzing computer system of an institute for collecting and analyzing purchase-history data in a database, the purchase-history data including at least (1) a customer name or customer code, (2) a product code, (3) the quantity of items purchased, (4) the monetary sum of items purchased, and (5) the time of purchase, with all said data collected regarding transactions of sales outlets for the merchandise, electronic transactions conducted via the Internet, and direct transactions, including transactions by telephone and mail, when customers purchase products of a specific manufacturer or brand in a specific market. The sales-predicting method comprising the steps of (1) constructing a customer purchase-history database for accumulating data on customers that purchase merchandise of specific manufacturers or brands; (2) dividing customers into m×n cells according two axes, including a purchase-amount index for classifying customers into a plurality of categories m in order of purchase sum or quantity based on the data stored in the customer purchase-history database for a specified period, and a user-type index for classifying customers by user type into a plurality of categories n according to combinations of merchandise purchased during the same period, with customers being classified in a range from customers who purchase a majority of the types of merchandise to customers who purchase 0 or 1 kind type of the merchandise; and (3) generating a current value map based on these cells so as to determine the current customer value in each cell; (4) recording in the customer purchase-history database the user type classifications extrapolated from purchase sums, quantities, and other purchase details for products of all manufacturers and brands, including those of other manufacturers and brands, in a specific market, the extrapolated purchase data including product purchase history of membership credit cards having a common id and affiliated with a plurality of businesses in various industries, as well as data obtained through questionnaires and/or marketing approaches at sales outlets, questionnaires and/or marketing approaches in electronic transactions and direct transactions, questionnaires and/or marketing approaches by direct mail, e-mail, and telephone, and customer data on sales clerks; (5) determining the magnitude of current and future customer value and resources thereof for products of specific manufacturers or brands based on data in the database; (6) providing data for selecting effective sales-promotion investments suited to the customers; and (7) providing a method for predicting sales suited to the target and conditions of the investments.

Further, a sales-predicting method based on triple-axis mapping of customer value employing a customer value-analyzing computer system of an institute for overseeing purchase-history data that includes at least either a customer name or code, product code, quantity, purchase sum, and time of purchase collected through transactions of sales outlets for the merchandise, electronic transactions conducted via the Internet, and direct transactions, including transactions by telephone and mail, when customers purchase products of a specific manufacturer or brand in a specific market; and a customer-value determining method capable of finding effective marketing approaches and improving overall sales by selecting not only customers having current value, but also customers with high future potential value, using a customer-purchase-history database storing the customer-purchase-history data for merchandise of specific manufacturers or brands, and a total manufacturer/brand customer-purchase database that accumulates data quantifying customer-purchase behavior regarding products of all manufacturers and brands in a specific market based on responses to questionnaires and/or marketing approaches at points of sale, in electronic transactions, or in direct transactions, data on sales clerks, and purchase history for membership credit cards with common ids that are affiliated with businesses in various industries. The sales-predicting method comprising the steps of (1) classifying customers according to a purchase-amount index, whereby the purchases of merchandise of specific manufacturers or brands in specific markets are calculated in terms of the monetary sum of purchases, the quantity of items purchased, the volume or the like of merchandise purchased by customers or members of household units in a specified period; (2) classifying customers into a plurality of categories m based on this data stored in the customer-purchase-history database, with such categories including at least a heavy-purchase classification, a medium-purchase classification, and a light-purchase classification; (3) classifying customers according to a user-type index, whereby customers who purchase products of specific manufacturers or brands are classified into a plurality of categories n based on data in the purchase-history database, with said categories including an upper category of customers who purchase all types of merchandise of the manufacturers or brands in the specified period, an upper-middle category of customers who purchase a majority of types of merchandise, a middle category of customers who purchase one-half or more of the types of merchandise, an average category of customers who purchase less than one-half or an average amount of the merchandise, and a lower category of customers who purchase 0 or 1 kind type product; (4) creating a current customer-value map by dividing customers into m×n cells according to the customer-amount index and the user-type index and generating numerical data indicating the structure and purchasing status of customer groups for each cell, based on the customer-purchase-history database; (5) classifying customers by relevance, whereby customers are classified into a plurality of categories m according to purchase monetary sums or quantities of items purchased within each specified periods for merchandise of all manufacturers or brands based on data abstracted from the total manufacturer/brand customer-purchase-history database, in order to determine the future value of customers in each cell; (6) classifying customers by relevance, whereby customers are classified by user type into at least n categories according to combinations of merchandise purchased during said specified periods, from customers who purchase a majority of the types of merchandise to customers who purchase 0 or 1 kind type of merchandise, based on data stored in the total manufacturer/brand customer-purchase-history database and further dividing the n categories into at least m×n cells according to purchase-amount classifications for each category; (7) classifying customers by relevance by extracting purchase data including product-purchase history of membership credit cards that have a common id and that are affiliated with a plurality of businesses in various industries, as well as data obtained through questionnaires and/or marketing approaches at sales outlets, questionnaires and/or marketing approaches in electronic transactions and direct transactions, questionnaires and/or marketing approaches by direct mail, e-mail, and telephone, and customer data received from sales clerks, and by categorizing the customers by user type based on data extrapolated from purchase sums, quantities, and other purchase details for products of all manufacturers and brands in a specific market; and (8) predicting sales by determining the magnitude of current and future customer value and resources thereof for products of specific manufacturers or brands; providing effective customers list data for selecting effective sales-promotion investments suited to the customers; and provides a method for predicting sales suited to the target and conditions of the investments.

Further, customers are arranged in order from largest purchase amount to smallest purchase amount in the step of classifying customers according to purchase amount, and they are placed in one of three categories, including a heavy-purchase classification (h) for customers who account for about 50% of the total amount expended on purchases, a medium-purchase classification (m) for customers who account for about 30% of the total amount expended on purchases, and a light-purchase classification (l) for customers accounting for the remaining 20% of the total amount expended on purchases.

Further, numerical data indicating the structure and purchase condition of customer groups in each cell includes: the customer or household component percentage; the component percentages of purchase-expenditure amounts, quantities numbers, or volumes; the purchase sum per person; the number of transactions per person; and the number of customers. In addition, sales for the near future can be predicted by creating maps for consecutive time periods in the current customer-value map-creation step and comparing data for like cells in each map.

Further, (1) response data for marketing approaches targeting each customer in each cell, including inquiries from customers, requests for information materials, store visits, purchases, purchase sums, ongoing purchases, and ongoing-purchase-amount data, is stored in the marketing-approach-response database, (2) the results of the marketing approaches for each cell are analyzed based on data in the marketing-approach-response database, and (3) subsequent marketing approaches are conducted only for cells determined to be highly effective.

Further, the specific markets include at least cosmetics, soaps, clothing and apparel, decorations, handbags and travel luggage, home appliances, computers and peripherals, services including distribution and transport, and alcoholic beverages such as beer, wine, brandy, and whiskey.

BRIEF DESCRIPTION OF THE DRAWINGS

In the drawings:

FIG. 2 shows the flow of operations in the method of determining customer value with three indices according to the present invention.

FIG. 3 shows the flow of operations in the method of determining customer value with three indices according to the present invention.

FIG. 4 shows an embodiment of a current customer-value map, with (a) showing the three-axes construction and (b) showing an example of specific data for the hatched portion in (a).

FIG. 5 shows an embodiment of a future customer-value map, with (a) showing the construction and (b) showing an example of specific data for the hatched portion in (a).

FIG. 8 is a customer-value map showing an embodiment for a specified period Z, with (a) showing the construction and (b) and (c) showing examples of data.

FIG. 9 is a customer-value map for an embodiment for a specified period Y, showing the direct effects of the marketing approach, with (a) showing the construction and (b) and (c) showing examples of data.

FIG. 10 is a customer-value map for an embodiment of a specified period Y, showing the indirect effects of the marketing approach, with (a) showing the construction and (b) and (c) showing examples of data.

BEST MODE FOR CARRYING OUT THE INVENTION

Figure 1:
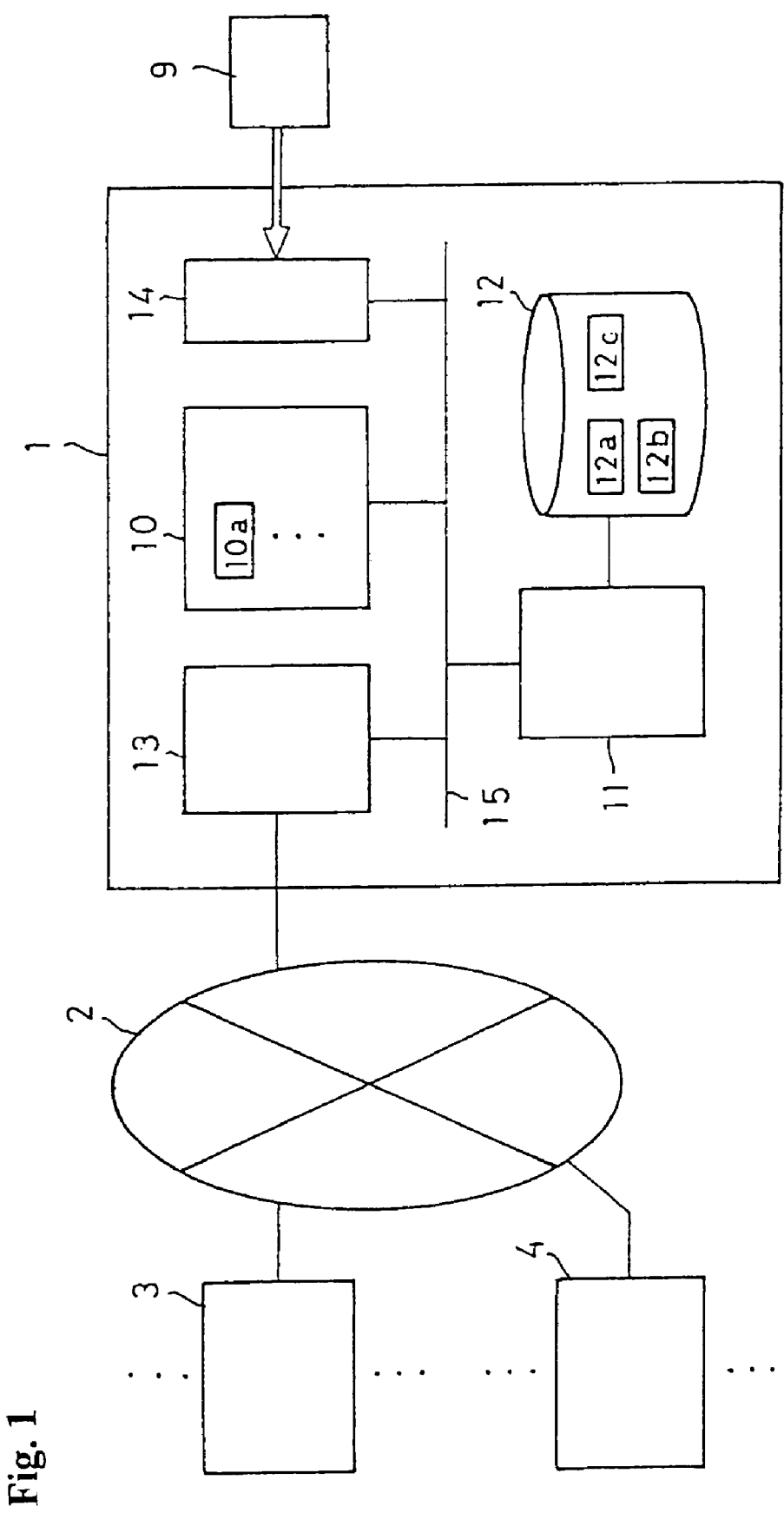
FIG. 1 is an example configuration of a computer system for executing a method of determining customer value based on three indices according to the present invention; the figure shows the relationship between the computer system, sales terminals, and customer terminals connected via a communication line.

FIG. 1 shows an example of a configuration of a computer system 1 designed to determine customer value based on three indices according to the present invention. FIG. 1 also shows the relationship between the computer system 1, sales terminals 3 at points of sale, and customer terminals 4. The sales terminals 3 and customer terminals 4 are connected to the computer system 1 via a communications circuit 2. The numeral 9 indicates a purchase form used when making direct transactions with a customer.

The part labeled 10 is a processing server for analyzing customer value. The processing server 10 includes analyzing programs 10a that determine customer value according to the present invention.

The numeral 11 indicates a database server for managing a database 12. The database 12 includes at least the following sub-databases: a customer-purchase-history database 12a, a total manufacturer/brand customer-purchase-history database 12b, and a marketing-approach-response database 12c.

The numeral 13 is a Web server 13. The numeral 14 is a terminal 14 allowing the input of form data 9 by manufacture when conducting direct transactions with a customer. The terminal 14 also serves as a document-outputting terminal used in marketing approaches, such as the sending of direct mail or questionnaires to customers. The numeral 15 refers to a local area network (LAN).

The customer-purchase-history database 12a stores purchase-history data that is acquired when a customer purchases merchandise of specific manufacturers or brands in a specific market. This purchase-history data includes at least customer codes, products codes, quantities purchased, monetary amounts of purchase, and the time of purchases—data acquired in transactions at sales outlets, in electronic transactions with customers via the Internet, or in direct transactions with customers.

A current customer-value map is created from the purchase-history data stored in the customer-purchase-history database 12a, as described below. A map is created by dividing the customers among m×n cells according to two axes. The first axis is a purchase-amount index for classifying customers in a plurality of categories m according to amounts of purchases in each specified period. The customers are arranged in order according to the monetary sums of purchases or the quantities of items purchased, based on the purchase-history data. The second axis is a user-type index for classifying customers in a plurality of user-type categories according to combinations of merchandise purchased by customers during said specified period—from customers who purchase a majority of the plurality of the varieties of merchandise to customers who purchase 0 or 1 kind type of merchandise. In this way, it is possible to analyze the current value of customers in each cell of the map.

By analyzing maps for current customer value in two consecutive periods, it is possible to predict percentages of customer movements and the inflow/outflow of customers for each cell in the next specified period.

Here, a majority of the purchase-history data for transactions at sales outlets is transmitted from the sales terminals 3 shown in FIG. 1 to the computer system 1 via the communications circuit 2.

Purchase-history data of electronic purchases by customers is transmitted to the computer system 1 via the communications circuit 2 from the customer terminals 4, shown in FIG. 1.

Purchase-history data for direct transactions with customers is input via the terminal 14 using a purchase record.

The total manufacturer/brand customer-purchase-history database 12b stores extracted data for quantifying the purchase behavior of customers; in other words, each manufacturer's or each brand's percentage of sales of the total sales of all merchandise of all manufacturers and brand in a specific market, including merchandise of other manufacturers and other brands. Data stored in the database includes—in addition to the responses to questionnaires and/or marketing approaches at sales outlets—questionnaires and/or marketing approaches in electronic transactions and direct transactions (including transactions by telephone and mail), customer behavior as reported by sales clerks, responses to questionnaires and/or marketing approaches via direct mail or e-mail, extracted data relating to purchases, including the product-purchase history of membership credit cards with a common id that are affiliated with various businesses in a plurality of industries.

A map of future customer value according to the aforementioned three indices is created so as o quantify customer-purchase behavior based on data extracted from the total manufacturer/brand customer-purchase-history database 12b, as described below.

The method for creating the map comprises relevance classifications (a), (b), and (c). The relevance classification (a) classifies customers by the monetary amounts of purchases, placed in order according to the purchase's monetary sum or the like and based on data extracted for each specified period. The relevance classification (b) classifies customers by user type, based on data stored in the database 12b, into at least n categories according to combinations of merchandise purchased during said specified period, from customers who purchase a majority of the types of merchandise to customers who purchase 0 or 1 kind type of merchandise. The n categories are further divided into at least m×n cells according to purchase-amount classifications for each category. The relevance classification (c) classifies customers according to various marketing approaches and/or sales correspondence, including direct mail or e-mail sent to customers of each cell.

Here, sales correspondence is distributed a plurality of times over an interval equal to or greater than the specified period mentioned above. An "approach number" is attached to each distributed correspondence and is accumulated in the total manufacturer/brand customer-purchase-history database 12b. The terminal 14 shown in FIG. 1 serves to distribute most sales-correspondence documents. However, these documents can also be distributed via the sales outlets.

The marketing-approach-response database 12c stores responses to the marketing approaches. Included in these recorded responses are information obtained from inquiries from customers, requests for information materials (catalogs), store visits, purchases, monetary sums of purchases, ongoing purchases or repeat purchases, and cumulative data regarding ongoing purchases. The input route for this data is the same as that for the customer-purchase-history database 12a.

Next, the process of operations performed by the analyzing programs 10a storing the method of determining customer value according to the present invention will be described with reference to the flowcharts in FIGS. 2 and 3.

Purchase-history data is collected via routes (a), (b), and (c), described below, each time a customer purchases merchandise of specific manufacturers or brands in a specific market.

Route (a) is a transmission path from a sales terminal 3 to the computer system 1 via the communications circuit 2.

Route (b) is a transmission path from a Web-page input screen on a customer terminal 4 to the computer system 1 via the communications circuit 2.

Route (c) is a path for inputting data via the terminal 14 of the computer system 1 using data on a form created through direct transactions with a customer (S 21).

Such data is accumulated one by one in the customer-purchase-history database 12a of the computer system 1 (S 22).

Using the analyzing programs 10a, the processing server 10 of the computer system 1 begins to generate a current customer-value map by classifying customers in the order described below for each specified period (a period of about 3 months or 6 months; S 23).

Next, will be described the process for generating a purchase-amount index.

The amount of money spent by customers or members of household units for merchandise of specific manufacturers or brands in specific markets is divided into a plurality of classifications m based on data in the customer-purchase-history database 12a. The plurality of classifications m includes at least a heavy-purchase classification (H), a medium-purchase classification (M), and a light-purchase classification (L) determined according to the amounts of purchases for each specified period t. The amount of a purchase is the monetary sum of the purchase, the quantity number, or the volume of the products.

Next, an example of the above purchase-amount classification is presented. First, customers are listed in order of purchase amounts, from greatest to least, in a specified period t. Customers accounting for about 50% of the overall purchase amount are classified in the heavy classification (H). Those occupying about 30% of the total purchase amount are classified in the medium classifications (M), and the remaining customers are allocated to the light classification (L) (S 24).

Next, the process for generating the user-type index will be described.

In this example, customers who purchase merchandise of specific manufacturers or brands have purchased basic types of merchandise A, B, or C, based on the data in the customer-purchase-history database 12a. (for example, when the specific market is cosmetics, the types of products might include a basic cosmetic A, a special whitening cosmetic B for use as a foundation, and a special age-related cosmetic C effective for wrinkles and the like.) This data is classified in six categories, including customer category (ABC) for customers who purchase all three types, customer category (AB) for customers who purchase types A and B, customer category (AC) for customers who purchase types A and C, customer category (A) for customers who purchase only type A, customer category (B) for customers who purchase only type B, and customer category (C) for customers who purchase only type C (S 25).

Next, the customers are divided into m×n cells (3×6 cells in this example) according to the customer-amount index and the user-type index (S 31).

Next, a current customer-value map is generated based on the customer-purchase-history database 12a by calculating numerical data indicating the structure and purchasing status of customer groups for each cell (S 32).

Here, the numerical data indicating the structure and purchasing status of customer groups in each cell includes the customers in each cell as a percentage of the total, their purchase sums as percentages of the total purchases, the purchase sum per person, the number of store visits per person, the number customers, and the like.

FIG. 4 shows the example described above. FIG. 4(*a*) shows the triple-axis configuration, while (*b*) shows a specific example of data for the diagonal-hatching portion of FIG. 4(*a*). In FIG. 4(*b*), the horizontal axis indicates the user-type index, divided into the six categories (ABC), (AB), (AC), (A), (B), and (C). The vertical axis indicates the purchase-amount index divided into the three categories (H), (M), and (L). Hence, the customers are ultimately divided among 3×6=18 cells. Each cell includes four types of data: the customer percentage, the percentage of total purchases, the amount expended on purchases, and the number of store visits per person. FIG. 4(*b*) is one example of specific data.

At the same time that a current customer-value map is generated, as described above, for the current point in time, the marketing approach described below is conducted so as to predict future customer value.

This marketing approach comprises a relevance classification (α) in which customers are classified according to the monetary amounts of their purchase within a specified period into one of three categories (H), (M), or (L), based on data abstracted from the total manufacturer/brand customer-purchase-history database 12b; a user-type relevance classification (β) whereby customers are classified by user type into one of seven categories, including the six categories (ABC), (AB), (AC), (A), (B), and (C) and an additional category (D) for customers who also purchase products of other manufacturers and brands; and a sales-correspondence approach (γ) in which the terminal 14 outputs sales correspondence such as questionnaires via direct mail, e-mail, and telephone to customers of each cell (S 33).

After-sales correspondence is distributed to the customers, and customer data is recorded in the total manufacturer/brand customer-purchase-history database 12b for a fixed period Z (for example, about 2-3 months) following the beginning of the marketing approach (S 34).

As described above, sales correspondence is distributed to customers of each cell. Subsequently, the responses are quantified to generate a customer-purchase-relevance index.

A map of customer value is generated for this fixed period Z based on the data stored in the total manufacturer/brand customer-purchase-history database 12b. Future data is predicted by comparing the current customer-value map to data before the marketing approach and creating a future customer-value map by calculating the percentage of repeat customers, ex-customers, and new customers for each cell and the percentage of increase or decrease in the total number of customers and total sales for the specific merchandise (S 35).

At the same time that a current customer-value map is generated for the current point in time, as described above, a future customer-value map is begun to be generated by classifying customers in the order described below in order to predict customer value for the future.

Now the process for generating a customer-purchase-relevance index will be describes.

First, customers are classified into a total of 21 cells according to the relevance classification (α), in which customers are classified in three categories (H), (M), and (L) according to their purchase amounts based on data extracted from the total manufacturer/brand customer-purchase-history database 12b for a specified time period; and the user-type relevance classification (β), whereby customers are classified into seven categories, including the six user type (ABC), (AB), (AC), (A), (B), and (C) and an additional customer bracket (AD) for customers purchasing a combination of products including types not sold by the specific manufacturer or brand.

Next, the customers are divided into m×n cells (21×6 cells in the present embodiment) based on the customer-purchase-relevance index and user-type index.

The total manufacturer/brand customer-purchase-history database 12b is prepared in advance as described below.

That is, responses to questionnaires filled out at sales offices, responses to questionnaires in electronic transactions and direct transactions (including transactions by telephone and mail), data regarding customer behavior from clerks at points of sale, and responses to questionnaires by direct mail, e-mail, and telephone are recorded in the total manufacturer/brand customer-purchase-history database 12b along with extracted data relating to purchases, including the product-purchase history of membership credit cards having a common id that are affiliated with a plurality of businesses in various industries.

Next, a future customer-value map is generated based on the total manufacturer/brand customer-purchase-history database 12b and customer-purchase-history database 12a by calculating numerical data indicating the structure and purchase status of the customer group in each cell within a fixed period X (for example, about 2-3 months).

Here, the numerical data indicating the structure and purchase status for each cell includes the customers in each cell as a percentage of the total, their purchase sums as a percentage of the total, the purchase sum per person, the number of transactions per person, the number of customers, and the like.

FIG. 5 shows the example described above. FIG. 5(*a*) shows the triple-axis configuration, while FIG. 5(*b*) shows a specific example of data for the portion indicated by diagonal hatching. Here, the horizontal axis represents the user-type index for a specific manufacturer/brand in a specific industrial market and includes the six categories (ABC), (AB), (AC), (A), (B), and (C). The vertical axis represents the customer-purchase-relevance index and is divided into 21 categories, including the relevance classifications (H), (M), and (L) determined by purchase amounts x, and the user-type relevance classifications (ABC), (AB), (AC), (A), (B), (C), and (AD). Hence, the customers are ultimately divided into 126 cells (6×21), whereby each cell includes the customer percentage of the total, the purchase sum percentage of the total, the purchase sum, and number of store visits per person.

In the customer-value determining method described above, the future customer-value map allows one to determine what percentage of one's own merchandise is being purchased in relation to the purchases of merchandise of all manufacturers and brands in a specific market, or what the purchasing behavior of customers is towards new product fields. In this way, the customer-value determining method enables efficiently approaching not only customers that currently have good value for specific manufacturers or brands, but also customers with high potential for the future.

In addition, by comparing the future customer-value map to the current customer-value map, it is possible to quantify the magnitude of potential value of customers, thereby further improving the efficiency of the marketing approach.

Take, for example, customers placed in the relevance category (H) according to purchase amounts in the future customer-value map and in the purchase-amount category (L) in the current customer-value map. The future value of these customers can be estimated by the difference (H)-(L). By using the future value map in this way, it is possible to determine resources of future value of customers.

Response data for approaches executed using the method for determining customer value with three indexes configured by future and current customer-value maps is accumulated in the marketing-approach-response database 12c for storing such responses. These responses include inquiries from customers, requests for information materials (catalogs), store visits, purchases, purchase sums, ongoing purchases or repeat purchases, and data regarding ongoing-purchase amounts. The input route for data concerning specific manufacturers and brands is the same as that for the customer-purchase-history database 12a, while that for data concerning all manufacturers and brands is the same as that for the total manufacturer/brand customer-purchase-history database 12b.

By conducting marketing approaches for customers in each cell and quantifying the responses to these approaches as described above, it is possible to determine customer value with consistently high precision by updating the purchase-amount index and user type for specific manufacturers/brands and the customer-purchase-relevance index for all manufacturers/brands at regular intervals.

Further, by continuously creating current customer-value maps for each specified period and comparing data for each cell, it is possible to predict customer movement in the near future and the total sales that will be generated by those customers.

In other words, according to the procedure described above, a current customer-value map and future customer-value map are generated for each specified period X, based on the customer-purchase-history database 12a and the total manufacturer/brand customer-purchase-history database 12b, and marketing approaches are conducted for customers in each cell. A current customer-value map and future customer-value map are generated for each specified period Y after marketing approaches are conducted and include response data to these approaches stored in the marketing-approach-response database 12c. Assuming that the same marketing approach has been executed for customers in the specified interval Y as that conducted in the specified interval X, it is possible to estimate a current customer-value map for a specified interval Z after the marketing approach using the same procedure.

Figure 6:
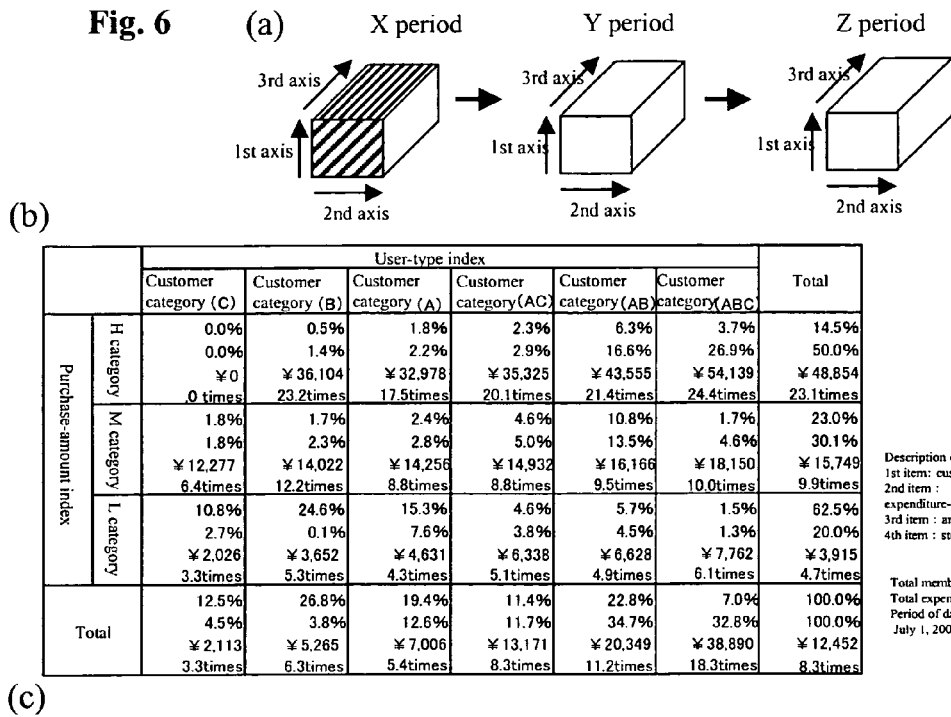
FIG. 6 is a customer-value map showing an embodiment for a specified period X, with (a) showing the construction and (b) and (c) showing examples of data.
Figure 7:
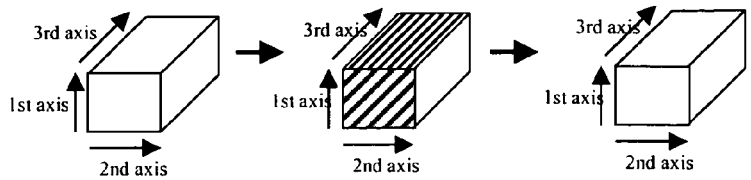
FIG. 7 is a customer-value map showing an embodiment for a specified period Y, with (a) showing the construction and (b) and (c) showing examples of data.

The example described above is shown in FIGS. 6, 7, and 8. FIG. 6 shows the example for the specified period X, FIG. 7 for the specified period Y, and FIG. 8 for the specified period Z. Within each of these examples, (b) is the current customer-value map, while (c) is the future customer-value map. Marketing approaches were conducted only for customers in the purchase-amount category (H) x the user-type category (ABC) cell for the current customer-value map during the x period and y period.

Now a more-detailed description of the drawings will be presented. The effects of the marketing approaches for each cell were estimated in the manner described below by comparing the current customer-value map for the specified period X prior to conducting the marketing approach (indicated in FIG. 6(b)) and the future customer-value map (indicated in FIG. 6(c)), and between the current customer-value map for the specified period Y after beginning the marketing approach (indicated in FIG. 7(b)) and the future customer-value map (indicated in FIG. 7(c)). FIG. 8 shows examples of the current customer-value map and future customer-value map for the specified period Z after the marketing approach was begun.

Take for assumptive example, a cell SMN in column m and row n in the current customer-value map configured of the purchase-amount index and the user-type index. The cell SMN includes the repeat-customer percentage T % of customers in the cell SMN that have remained in the cell SMN due to the influence of the marketing approach; and the ex-customers percentage who have migrated out of the cell SMN (details regarding the percentage of ex-customers include both customers that have migrated to cells outside the SMN cell and customers who have stopped purchasing altogether). This completes the description of customers directly affected by the marketing approach.

FIG. 9 shows the example described above. FIG. 9 quantifies the direct effect of marketing approaches for the specified period following the approach. During the specified period after conducting a marketing approach aimed at customers in the purchase-amount category (h) x the user-type category (ABC) cell in the current customer-value map, 44.8% of the customers remained in the same cell, 37.1% migrated to other cells, and 18.1% stopped purchasing altogether.

In terms of indirect effects on the cell SMN, there is also a new-customer percentage consisting of customers who have migrated from other cells to the cell SMN (the details of the new-customer percentage include both customers who have come to the SMN cell from other cells and new customers who had not purchased in the previous period).

FIGS. 10(a), (b), and (c) illustrate the above example. FIG. 10(b) quantifies the indirect effects of a marketing approach during a specified period after conducting the marketing approach. During this specified period after conducting a marketing approach targeting customers in the purchase-amount category (H) xuser-type category (ABC) cell in the current value map X, 13.3% of customers in the (M)x(AB) cell not targeted by the approach remained in the same cell, 3.8% migrated to the (H)x(ABC) cell, 42.5% migrated to other cells, and 40.4% stopped purchasing altogether. FIG. 10(c) shows that 21,432 previous nonpurchasers began purchasing. Of these new customers, 5.7% migrated to the (H)x(ABC) cell, while 94.3% migrated to other cells.

It is possible to find the purchase sums, absolute-count values, and percentages of increase and decrease for the above repeat customers, new customers, and ex-customers.

With this data, it is possible to perform more-accurate predictions of future values.

INDUSTRIAL APPLICABILITY

The sales-predicting method based on triple-axis mapping of customer value of the present invention has the following effects. The sales-predicting method of the present invention can determine the magnitude and resources of current value and future value for customers of specific merchandise; can provide data for selecting effective sales-promotion investments suited to these customers; and can provide a sales-predicting method according to targets and conditions of the investments.

What is claimed is:

1. A sales-predicting method which is performed by execution of computer readable program code using at least one processor of at least one computer system, based on triple-axis mapping of customer value, employing a computer system that collects and analyzes purchase-history data in a database;
the computer system comprising a processing server having a group of analyzing programs for analyzing customer value, a database server for managing various databases, a web server, and a data input/output terminal connected to a communication line;
the database server comprising a customer-purchase-history database for accumulating purchase-history data including (1) a customer name or code, (2) a product code, (3) the quantity of items purchased, (4) the amount expended on purchases, and (5) the time of purchase, with the purchase-history data collected through transactions of sales outlets for the merchandise, electronic transactions conducted via the Internet, and direct transactions including transactions by telephone and mail when customers purchase products of a specific manufacturer or brand in a specific market; and
a total manufacturer/brand customer-purchase-history database for accumulating purchase-history data including product-purchase history of membership credit cards having a common ID and affiliated with a plurality of businesses in various industries, as well as data obtained through questionnaires and/or marketing approaches at sales outlets, questionnaires and/or marketing approaches in electronic transactions via the web server, questionnaires and/or marketing approaches by direct mail, email, and telephone, and customer data reported by sales clerks;
the sales-predicting method comprising the steps:
creating, using at least one of the processors, a purchase-amount index (first axis) of cells by searching the customer-purchase-history database at specified periods and classifying customers into a plurality of classifications in order of the amounts expended on purchases or the quantity of items purchased, based on purchase-history data extracted during the search;
creating, using at least one of the processors, a user-type index (second axis) of cells by searching the customer-purchase-history database at said specified periods and classifying customers into a plurality of classifications according to user type as determined by combinations of merchandise from customers who purchase the majority of types of the merchandise to customers who purchase 0 or 1 type of the merchandise, by combining a plurality of types of merchandise by specific manufacturers or brands purchased in each specified period;
creating, using at least one of the processors, a current customer-value map by dividing customers into cells according to a product of the plurality of classifications in said first index and said second index for analyzing the current value of customers in each cell;
classifying, using at least one of the processors, customers by relevance by searching said total manufacturer/brand customer-purchase-history database at said specified periods and classifying customers by purchase amount into a plurality of categories according to purchase monetary sums or quantities of items purchased based on data abstracted from the total manufacturer/brand customer-purchase-history database;
classifying, using at least one of the processors, customers by relevance by searching said total manufacturer/brand customer-purchase-history database at said specified periods and classifying customers by user type into a plurality of categories according to combinations of merchandise purchased during said specified periods, from customers who purchase the majority of the types of merchandise to customers who purchase 0 or 1 type of the merchandise, based on data extracted during the search;
creating, using at least one of the processors, a customer-purchase-relevance index (third axis) based on a product of the plurality of classifications from each of said two relevance classifying steps; and
creating, using at least one of the processors, a future customer-value map by dividing customers into cells formed by a product of each plurality of classifications in said user-type index (second axis) and said customer-purchase-relevance index (third axis) to analyze the future value for customers in each cell.

2. The sales-predicting method based on triple-axis mapping of customer value as recited in claim 1, wherein:
the database further comprises a marketing-approach response database for accumulating responses to said marketing approaches; and further comprising the steps of:
performing, using at least one of the processors, various marketing approaches and/or sales correspondence including direct mail or e-mail sent to customers of each cell a plurality of times over an interval equal to or greater than said specified period, in addition to said two relevance
classifying steps for creating said customer-purchase-relevance index (third axis);
accumulating, using at least one of the processors, responses to sales correspondence in said marketing-approach response database and generating the customer-purchase-relevance index (third axis) for sorting customers according to cell by quantifying the responses; and
creating, using at least one of the processors, a future customer-value map according to cells in which customers are sorted using the three axes for analyzing the future value of customers in each cell.

3. A sales-predicting method which is performed by execution of computer readable program code using at least one processor of at least one computer system, based on triple-axis mapping of customer value employing a customer value-analyzing computer system for collecting and analyzing purchase-history data in a database, with the purchase-history data including at least (1) a customer name or customer code, (2) a product code, (3) the quantity of items purchased, (4) the amount expended on a purchase, and (5) the time of purchase, with said data collected through transactions of sales outlets for the merchandise, electronic transactions conducted via the Internet, and direct transactions including transactions by telephone and mail when customers purchase products of a specific manufacturer or brand in a specific market;

the computer system comprising a processing server having a group of analyzing programs for analyzing customer value, a database server for managing various databases, a web server, and a data input/output terminal connected to a communication line;

the database server comprising a customer-purchase-history database for accumulating the purchase-history data concerning customers that purchase merchandise of a specific manufacturer or brand; and a total manufacturer/brand customer-purchase-history database for accumulating customer-purchase-history data extrapolated from amounts expended on purchases, quantities of items purchased, and other purchase details for products of all manufacturers and brands, including those of other manufacturers and brands, in a specific market, with the extrapolated purchase-history data including product-purchase history of membership credit cards having a common ID and affiliated with a plurality of businesses in various industries, as well as data obtained through questionnaires and/or marketing approaches at sales outlets, questionnaires and/or marketing approaches in electronic transactions via the web server and direct transactions via the data input/output terminal, and questionnaires and/or marketing approaches by direct mail, e-mail, and telephone;

the sales-predicting method comprising the steps of:

searching, using at least one of the processors, said customer-purchase-history database, dividing customers into m×n cells according to two axes, including a purchase-amount index for classifying customers into a plurality of categories m in order of purchase sum or quantity based on data stored in the customer purchase-history database for each specified period, and a user-type index for classifying customers by user type into a plurality of categories n according to combinations of merchandise purchased during each specified period, with customers being classified in a range from customers who purchase a majority of the types of merchandise to customers who purchase 0 or 1 type of the merchandise, and generating a current customer-value map based on these cells so as to determine the current customer value in each cell; and searching, using at least one of the processors, the total manufacturer/brand customer-purchase-history database, dividing customers into cells according to a customer-purchase-relevance index (third axis) for cells classified according to a product of categories for customer-purchase-amount relevance and said user-type relevance in the specified periods, and creating a future customer-value map based on said third axis to determine the future value of customers in each cell;

determining, using at least one of the processors, the magnitude of current and future customer value and resources thereof for products of specific manufacturers or brands based on data in the customer-purchase-history database and total manufacturer/brand customer-purchase-history database, providing data for selecting effective sales-promotion investments suited to the customers, and providing a method for predicting sales suited to the target and conditions of the investments.

4. A sales-predicting method based on triple-axis mapping of customer value capable of finding effective marketing approaches and improving overall sales by selecting not only customers having current value, but also customers having high future-value potential, using a customer value-analyzing computer system of an institute for overseeing purchase-history data, with said data including at least (1) a customer name or customer code, (2) a product code, (3) the quantity of items purchased, (4) the amount expended on purchases, and (5) the time of purchases, with all said data collected through transactions of sales outlets for the merchandise, electronic transactions conducted via the Internet, or direct transactions including transactions by telephone and mail when customers purchase products of a specific manufacturer or brand in a specific market;

the computer system comprising at least a processing server having a group of analyzing programs for analyzing customer value, a customer-purchase-history database for accumulating purchase-history data on products of specific manufacturers or brands required for the analyzing programs, and a total manufacturer/brand customer-purchase-history database for accumulating data for quantifying the purchase behavior of customers for merchandise of all manufacturers or brands in a specific market based on questionnaires and/or marketing approaches at sales outlets, in electronic transactions, and in direct transactions, customer data reported by sales clerks, and product-purchase history of membership credit cards with a common ID that are affiliated with businesses in various industries;

the sales-predicting method comprising the steps of:

classifying, using at least one of the processors, customers according to a purchase-amount index (first axis), whereby the amount of money expended on merchandise of specific manufacturers or brands in specific markets is determined by the amount expended on purchases, the quantity of items purchased, the volume of items purchased, or the like of merchandise purchased by customers or members of household units in each specified period, and whereby customers are classified into a plurality of categories m based on this data, which is stored in the customer-purchase-history database, and with the categories including at least a heavy-purchase classification, a medium-purchase classification, and a light-purchase classification;

classifying, using at least one of the processors, customers according to a user-type index (second axis), whereby customers who purchase products of specific manufacturers or brands are classified into a plurality of categories n based on data in the purchase-history database, with the categories including an upper category for customers who purchase all types of merchandise of the manufacturers or brands in the specified period, an upper-middle category for customers who purchase a majority of the types of merchandise, a middle category for customers who purchase one-half or more of the types of merchandise, an average category for customers who purchase a one-half or an average amount of the merchandise, and a lower category for customers who purchase 0 or 1 type of products;

creating, using at least one of the processors, a current customer-value map by dividing the customers into m×n cells according to the customer-amount index and the user-type index and generating numerical data indicating the structure and purchasing status of customer groups for each cell, based on the customer-purchase-history database;

classifying, using at least one of the processors, customers by relevance, whereby customers are classified into a plurality of categories m according to purchase amounts ordered by amounts expended or quantities of purchases within a specified period for merchandise of all manufacturers or brands, based on data abstracted from the total manufacturer/brand customer-purchase-history database, in order to determine the future value of customers in each cell;

classifying, using at least one of the processors, customers by relevance, whereby customers are classified by user type into at least n categories according to combinations of merchandise purchased during the same period, from customers who purchase a majority of the types of the merchandise to customers who purchase 0 or 1 type of the merchandise, based on data stored in the total manufacturer/brand customer-purchase-history database, and further dividing the n categories into at lest m×n cells according to purchase-amount classifications for each category;

creating, using at least one of the processors, a customer-purchase-relevance index (third axis) by conducting such marketing approaches and/or sales correspondence as questionnaires and/or marketing approaches at sales outlets, questionnaires and/or marketing approaches in electronic transactions and direct transactions, questionnaires and/or marketing approaches by direct mail, e-mail, and telephone, and customer data reported by sales clerks, quantifying responses to these marketing approaches, and updating the content of the cells for each specified period;

creating, using at least one of the processors, a future customer-value map by dividing customers into cells formed by a product of each plurality of categories in said third axis and said second axis; and determining, using at least one of the processors, a relationship between the magnitude of current and future customer value and resources thereof for specific products and the effects of various marketing approaches, providing data for selecting effective sales-promotion investments suited to the customers, and providing a method for predicting sales suited to the target and conditions of the investments.

5. The sales-predicting method based on triple-axis mapping of customer value as recited in claim 4, whereby customers are arranged in order from largest purchase amount to smallest in the step for classifying customers according to purchase amount, and whereby customers are placed in one of three categories, including a heavy-purchase classification (H) for customers who account for about 50% of the total amount expended on purchases, a medium-purchase classification (M) for customers who account for about 30% of the total, and a light-purchase classification (L) for customers accounting for the remaining 20%.

6. The sales-predicting method based on triple-axis mapping of customer value as recited in claim 4, whereby numerical data indicating the structure and purchase condition of customer groups in each cell includes the customer or household component percentage, the component percentage of purchase sums, quantities, or volume, the amount expended per person, the number of transactions per person, and the number of customers, and whereby sales for the near future can be predicted by creating maps for consecutive time periods in the current customer-value map-creation step and comparing data for like cells in each map.

7. The sales-predicting method based on triple-axis mapping of customer value as recited in claim 4, wherein response data for marketing approaches targets each customer in each cell, with said response data including inquiries from customers, requests for information materials, store visits, purchases, purchase sums, ongoing purchases, and data regarding ongoing-purchase amounts, with said data stored in the marketing-approach-response database, and with the results of the marketing approaches for each cell analyzed based on data in the marketing-approach-response database, and subsequent marketing approaches conducted only for cells determined to be highly effective.

8. The sales-predicting method based on triple-axis mapping of customer value as recited in claim 1, whereby the specific markets include at least cosmetics, soaps, clothing and apparel, decorations, handbags and travel luggage, home appliances, computers and peripherals, services including distribution and transport, and alcoholic beverages including beer, wine, brandy, and whiskey.

9. The sales-predicting method based on triple-axis mapping of customer value as recited in claim 5, whereby numerical data indicating the structure and purchase condition of customer groups in each cell includes the customer or household component percentage, the component percentage of purchase sums, quantities, or volume, the amount expended per person, the number of transactions per person, and the number of customers, and whereby sales for the near future can be predicted by creating maps for consecutive time periods in the current customer-value map-creation step and comparing data for like cells in each map.

10. The sales-predicting method based on triple-axis mapping of customer value as recited in claim 5, wherein response data for marketing approaches targets each customer in each cell, with said response data including inquiries from customers, requests for information materials, store visits, purchases, purchase sums, ongoing purchases, and data regarding ongoing-purchase amounts, with said data stored in the marketing-approach-response database, and with the results of the marketing approaches for each cell analyzed based on data in the marketing-approach-response database, and subsequent marketing approaches conducted only for cells determined to be highly effective.

11. The sales-predicting method based on triple-axis mapping of customer value as recited in claim 6, wherein response data for marketing approaches targets each customer in each cell, with said response data including inquiries from customers, requests for information materials, store visits, purchases, purchase sums, ongoing purchases, and data regarding ongoing-purchase amounts, with said data stored in the marketing-approach-response database, and with the results of the marketing approaches for each cell analyzed based on data in the marketing-approach-response database, and subsequent marketing approaches conducted only for cells determined to be highly effective.

12. The sales-predicting method based on triple-axis mapping of customer value as recited in claim 2, whereby specific markets include at least cosmetics, soaps, clothing and apparel, decorations, handbags and travel luggage, home appliances, computers and peripherals, services including distribution and transport, and alcoholic beverages including beer, wine, brandy, and whiskey.

13. The sales-predicting method based on triple-axis mapping of customer value as recited in claim 3, whereby the specific markets include at least cosmetics, soaps, clothing and apparel, decorations, handbags and travel luggage, home appliances, computers and peripherals, services including distribution and transport, and alcoholic beverages including beer, wine, brandy, and whiskey.

14. The sales-predicting method based on triple-axis mapping of customer value as recited in claim 4, whereby the specific markets include at least cosmetics, soaps, clothing and apparel, decorations, handbags and travel luggage, home appliances, computers and peripherals, services including distribution and transport, and alcoholic beverages including beer, wine, brandy, and whiskey.

* * * * *